July 27, 1948.  D. R. McMULLEN  2,445,885
ALL STEEL HIGH PRESSURE VALVE
Filed March 24, 1944  2 Sheets-Sheet 1
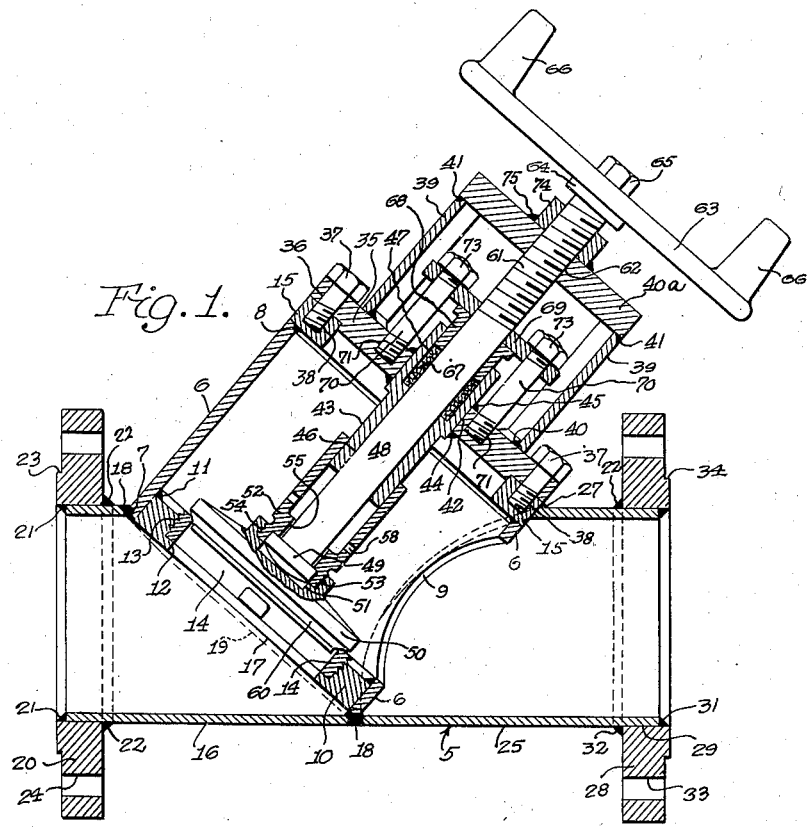
Inventor
Donald R. McMullen
Barthel & Bugbee
Attorneys July 27, 1948. D. R. McMULLEN 2,445,885
ALL STEEL HIGH PRESSURE VALVE
Filed March 24, 1944 2 Sheets-Sheet 2
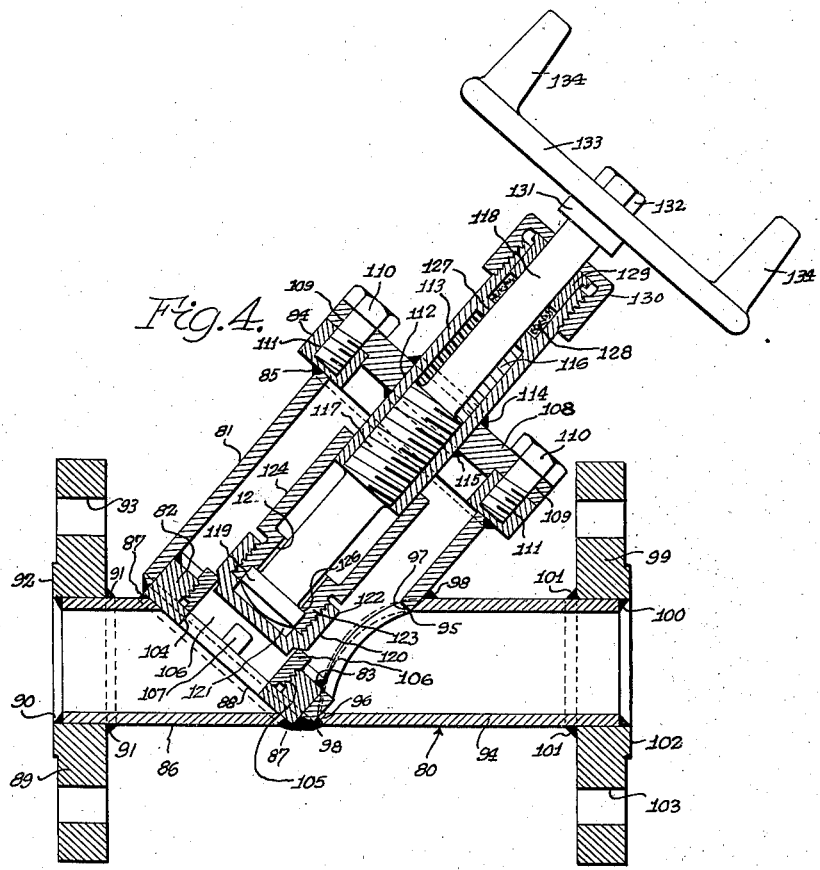
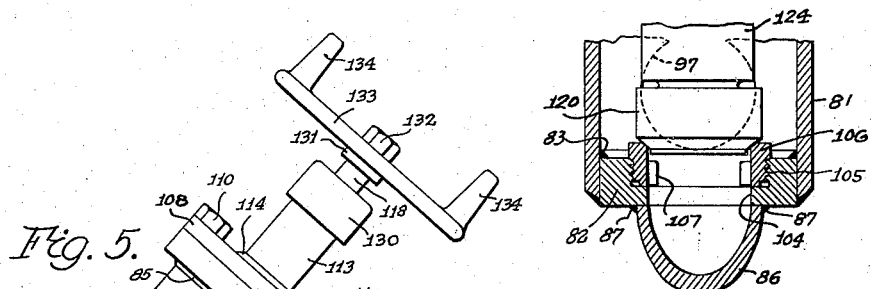
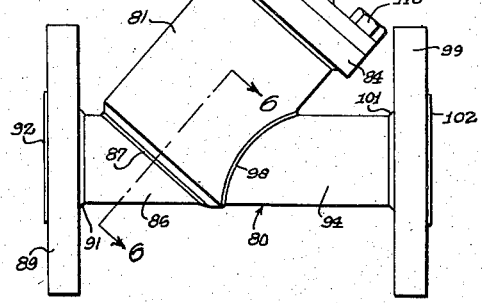
Inventor
Donald R. McMullen
Barthel + Bugbee
Attorneys Patented July 27, 1948

2,445,885

UNITED STATES PATENT OFFICE 2,445,885

ALL-STEEL HIGH-PRESSURE VALVE

Donald R. McMullen, Detroit, Mich.

Application March 24, 1944, Serial No. 527,861

3 Claims. (Cl. 251—156)

The present invention relates to improvements in valves, and more particularly, to an all-steel fabricated valve structure.

The primary object of the invention is to provide a valve structure which can be quickly and easily fabricated from tubular stock or tubing by welding the tubing in a unique manner and to produce a valve structure of high tensile strength capable of withstanding extremely high pressure.

Another object of the invention is to provide a valve structure of the above-mentioned type which can be economically constructed without resorting to expensive casting processes and equipment in the formation of the valve parts and valve body.

Another object of the invention is to provide an all steel valve structure which is formed of mild steel to facilitate the uniform welding thereof and easy machining of certain of said valve parts such as the coupling flanges and head plate.

Another object of the invention is to provide a valve body structure which is easily fabricated from tubular stock by cutting the stock to the desired lengths with certain ends of the stock cut on a bias so as to be interfitted and welded to correspondingly shaped ends of other pieces of stock and thereby form a complete valve body.

Another object of the invention is to provide an all steel fabricated valve by cutting the tubular stock to the desired length with certain ends thereof bevelled and shaped to permit the welding of said pieces of tubular stock in such a manner as to form a valve body with coupling flanges welded thereto at the ends thereof for accommodating and facilitating the coupling of pipes to the valve body.

Another object of the invention is to provide an all steel valve structure of the above-mentioned type having a reciprocating valve member which is seated and unseated by means of an operating screw having packing means so arranged as to permit the operation of the valve over long periods of time without appreciable wear, thereby eliminating the necessity of replacing the packing at frequent intervals.

Another object of the invention is to provide a fabricated valve structure of the above-mentioned type, the operative parts of which may be easily removed to facilitate the replacement of valve seats, valve disks and other parts subject to wear.

Another object of the invention is to provide a valve structure of the above-mentioned type which may be employed in various systems of fluid flow control without causing corrosion of the various valve parts by reason of the fact that the valve body is fabricated from tubular stock or metal pipe sections which are economically and commercially produced and which are cheaply and readily accessible.

Other objects and advantages of the invention will become apparent during the course of the following description of the accompanying drawing, wherein:

Figure 1 is a longitudinal cross-sectional view of a valve structure illustrating in detail a preferred embodiment of the invention;

Figure 2 is a side elevational view of the valve structure illustrating the manner in which the valve body is fabricated from sections of tubular stock;

Figure 3 is a diagonal cross-sectional view taken on line 3—3 of Figure 2 looking in the direction of the arrows and illustrating the manner in which the tubular sections of stock are welded together to form the valve body;

Figure 4 is a longitudinal cross-sectional view of a modified form of the invention showing the various structural details thereof and illustrating a slightly different valve sealing means therefor;

Figure 5 is a side elevational view of the form of the invention illustrated in Figure 4 showing the manner in which the several pipe sections constituting the valve body are arranged and welded at the juncture of the sections; and Figure 6 is an oblique cross-sectional view taken on the diagonal line 6—6 of Figure 5 looking in the direction of the arrows and illustrating the structural features embodied therein such as the removable valve seat structure and fabricated valve body.

In the drawings wherein for the purpose of illustrating the invention there is shown a preferred embodiment thereof, attention is first directed to Figures 1 to 3 inclusive wherein the reference character 5 will generally be employed to designate a fabricated valve body comprised of metal sections of tubing arranged and secured together in liquid tight relationship.

In constructing the valve body 5, a relatively short section of steel tubing 6 is provided to form the valve chamber of the valve body and said section is open at both ends and bevelled at its edges as at 7 and 8. A relatively large peripheral opening 9 is formed in the side wall of said pipe section as indicated in Figure 1 to connect said valve body with the inlet and outlet thereof.

Mounted in one of the open ends of said steel tube 6 is a metal ring 10 formed of mild steel or the like to permit the easy machining and finishing thereof and said ring 10 is secured in place by being internally welded to the steel tube 6 as at 11. The ring 10 is formed with a round opening or bore 12 terminating at one end in an enlarged internally screw-threaded bore 13 for receiving a removable valve seat 14. Similarly, a ring 15 is secured to the other end of said steel tubing section 6 by filling the groove formed by the bevelled edge 8 of the steel tube and the radial wall of said ring 15 with filling metal and then welding the ring to the tube as by means of arc welding or the like.

Secured to the valve chamber thus formed is a short section of steel tubing 16 slightly smaller in diameter than the valve chamber cylinder and said tube is diagonally cut on the oblique line 17, as indicated in Figure 1. The opening thus formed in the diagonally cut end 17 of the tube 16 is elliptical when viewed in edge elevation and it is intended to secure said edge to the metal ring 10 by running in filling metal in the groove formed by the bevelled edge 7 of the valve chamber cylinder 6 and the diagonal edge of the pipe section 16 and then welding said tube section to the ring 10 by means of arc welding or, if desired, by gas welding. If desired, the tube section 16 may be held in place prior to being welded by means of suitable jigs and fixtures or the tube section 16 may be tack welded to the valve chamber tube 6 at circumferentially spaced intervals to facilitate the complete welding thereof as at 18. As indicated in Figure 3, a portion of said steel tube section 16 will be welded to the steel valve chamber tube 6 at the major axis of the diagonally cut steel tube section 16 while the minor axis of the diagonally cut tube end will be welded to the ring 10, as at 19. This construction allows the use of tube diameters of true circular size and shape and eliminates the necessity of bending the steel tube 6 or the deformation of the pipe section 16 to bring the edges into meeting relationship.

Affixed to the free end of the tube section 16 is a disk-shaped pipe coupling flange member 20 which is fitted over the end of said tube and welded in place by internal and external welds 21 and 22 respectively. The disk-shaped member 20 is provided with an enlarged annular boss 23 on the radial wall thereof to provide a relatively flat surface to facilitate the coupling of other pipes to the valve casing 5 and thereby establish a liquid tight union therewith. A series of circumferentially spaced openings 24 are formed in the disk-shaped flange member 20 to accommodate coupling bolts or other pipe coupling devices.

The steel pipe section 16 forms an inlet for the valve body 5 and provides a coupling flange for connection with the coupling flange of an adjacent pipe section of a liquid conduction system. In a somewhat similar manner, an outlet is provided for the valve body 5 and said outlet comprises a short section of steel tubing 25 having its end cut diagonally as at 26 and curved in a plane at right angles to the major axis of the diagonal cut so as to conform to the cylindrical shape of the steel tube valve chamber section 6. As illustrated in Figures 1 and 2, the pipe section 25 is welded as at 27 to the cylindrical tube section 6 of the valve chamber as at 26 by arc welding or the like while the valve chamber section 6 and inlet tube section 16 are held in a suitable jig or fixture. The steel tube outlet pipe section 25 is disposed so that it registers with the outlet opening 9 in the valve chamber section 6 so that liquid may pass through the valve chamber and out of said outlet pipe section 25.

The free end of the pipe section 25 is provided with a flange 28 in the form of a disk-like member having a central opening 29 for reception on said free end. It is intended to weld the disk-like flange member 28 to the free end of the pipe section 25 as at 30 in substantially the same manner as described and set forth in connection with the pipe section 16 by internal and external welds 31 and 32 respectively. A series of circumferentially spaced bolt openings 33 are formed in the disk-like flange member 28 to facilitate the bolting of a pipe flange thereto when the valve is connected to the liquid flow system. An annular enlarged portion 34 is formed on the radial face of the disk-like flange member 28 to effect a liquid-tight union with a pipe section when the disk-like flange is brought into coupling relation therewith.

A bonnet structure is provided for the valve chamber 6 and comprises a cover plate 35 of disk-like form having a series of circumferentially spaced openings 36 adjacent the marginal edge thereof for receiving anchoring bolts 37. The ring 15 is provided with threaded openings 38 for receiving the inner threaded ends of said bolts 37 so as to securely hold said cover plate in place. The bonnet structure is fabricated from metal parts in the same manner as the valve body and includes a pair of diametrically opposed supporting members 39 having the lower ends thereof welded as at 40 to the cover plate 35. The upper ends of the steel plates 39 are connected to a cap 40a as by welding indicated as at 41.

Formed in the disk-like cover member 35 is a central opening 42 for receiving a tubular sleeve member 43 which is held in place by opposite welds 44 and 45 on each side of the cover plate 35. The tubular sleeve 33 is provided with a bore 46 terminating at one end in an enlarged bore 47 extending above the cover plate. Rotatably mounted in the tubular sleeve 43 and within said boss 36 is a rotary shaft 48 having its lower end as at 49 flanged to provide a supporting surface and swivel connection with a disk valve 50. The disk valve 50 is provided with a central opening 51 for receiving said enlarged portion 49 of the operating shaft 48 and said enlarged portion is retained in said recess by means of a sleeve 52 having one end reduced and threaded as at 53 for being received in the threaded portion 54 of said recess 51. The lower end of the sleeve 52 is reduced in diameter as at 55 to provide a shoulder for engaging the upper surface of the enlarged portion 49 of the operating shaft 48 and permit said shaft to swivel therein during rotation of the shaft. The upper end of the sleeve 52 is telescoped over the tubular member 43 to protect the shaft and exclude foreign matter therefrom. Vent openings 58 are formed in the sleeve 52 to permit the telescopic action of the tubular member 43 and shaft 52 without compressing the air therein. The disk valve 50 is ground as at 60 so as to properly seat on the removable valve seat 14.

The upper end of the operating rod 48 is screw-threaded as at 61 and extends through a threaded opening 62 in the top plate 40a so as to feed the valve 50 toward and away from the seat. The extreme free end of the operating shaft 48 is provided with an operating wheel 63 which is locked against an annular enlarged portion 64 of the operating shaft by means of a nut or the like as at 65. Projections 66 on the operating handwheel 63 allow the insertion of a tool so as to free the valve if the same should become stuck.

Mounted within the enlarged bore 47 of the tubular member 43 is a quantity of packing material 67 which is adapted to surround the shaft 48 and seal the same against liquid escape. A packing gland 68 likewise encircles the shaft and is urged into compressional engagement with the packing material 67 by means of a clamping plate 69 adapted to be drawn tightly down by means of bolts 70 having one of their ends threaded and anchored in suitable threaded openings 71 in the cover plate 35 while nuts 73 are threaded on the opposite ends of the bolts so as to securely hold the packing gland 68 in place. A nut 74 is welded to the top plate 40a of the bonnet structure as at 75 to strengthen the same and increase the threaded area for the screw threaded portion 61 of the operating shaft 48.

Attention is now directed to the modified form of the invention shown in Figures 4 to 6 inclusive wherein there is shown a valve body 80 constructed from fabricated steel tubing in a manner similar to the form of the invention shown in Figures 1 to 3 inclusive. The valve casing comprises a steel cylinder 81 having a ringlike member 82 in one end thereof held in place by welding as at 83. The upper end of the cylinder 81 is provided with a ring-like member 84 likewise welded in place as at 85. A short pipe section 86 is welded to the ring-like member 82 as at 87 and said pipe section 86 is diagonally cut as at 88 so that the steel tubing section 81 will project therefrom at an oblique angle. A flange plate 89 is fitted over the free end of the tubular section 86 and is welded thereto by internal and external welds 90 and 91. The flange plate 89 is provided with an enlarged annular portion 92 to provide a water tight union with a pipe section when the flange plate 89 is bolted thereto by passing bolts or other fastening elements through the circumferentially spaced openings 93. A pipe section 94 is welded to the steel pipe section 81 and said pipe section 94 is cut diagonally from the points 95 and 96 and arcuately in a place at right angles thereto so that the diagonally cut end of the pipe section 94 will fit the circular contour of the steel pipe section 81. An opening 97 is formed in the valve chamber section 81 to establish communication between the steel pipe section 94 and the interior of said valve chamber. The pipe section 94 is welded as at 98 to the valve chamber section 81 similar to the pipe section 86. Mounted on the free end of the pipe section 94 is a flange plate 99 held in place by internal and external welds 100 and 101 and said flange plate 99 is provided with an annular enlarged portion 102 to effect a tight sealing union with an adjacent pipe section when the flange plate 99 is connected therewith by clamping bolts extending through openings 103 in the flange plate 99 and through registering openings in the flange of the pipe being coupled thereto.

The ring-like member 82 is provided with a port 104 having an enlarged threaded bore 105 into which is fitted a removable valve seat 106. Inwardly extending projections 107 are formed on the valve seat 106 to receive a wrench or the like and permit the unthreading and removal of the valve seat from the threaded opening 105.

A valve bonnet structure is provided on the upper end of the valve chamber section and includes a disk-like plate 108 having circumferentially spaced openings 109 for receiving anchoring bolts 110. The anchoring bolts 110 are threaded in openings 111 in the ring-like member 84 registering with the openings 109. The disk-like plate 108 is provided with a central opening 112 for receiving a valve stem sleeve 113 and said sleeve is welded in place on opposite sides of the disk-like plate 108 as at 114 and 115. The sleeve 113 is provided with a threaded bore 116 for receiving the threaded portion 117 of a valve operating shaft 118 so as to feed the rod in and out of the valve chamber section 81. The lower end of the valve operating rod 118 is provided with a head 119 upon which is swivelled a valve member 120 as shown clearly in Figure 4. The valve member 120 is provided with a recess 121 for receiving the head 119 and said recess is enlarged and screw-threaded as at 122 for receiving the lower threaded end 123 of a valve rod encircling sleeve 124. The lower end of the valve rod encircling sleeve 124 is internally reduced as at 125 and provided with a shoulder 126 for engaging and retaining the head 119 in position and against the longitudinal movement but permitting rotational movement thereof so as to allow the valve member 120 to swivel thereon. The upper end of the valve rod encircling sleeve 124 is telescopically arranged relative to the sleeve 113 so as to slide over the lower end thereof to exclude foreign matter from the swivel joint of the valve member 120 and simultaneously guide the valve member 120 into a proper seating relation with the valve seat 106.

An internal shoulder 127 is formed in the upper end of the sleeve 113 to form a wall against which sealing and packing material 128 may seat. A packing gland 129 is inserted in the bore of the seat 113 and said packing gland may be tightened by means of a gland nut 130 threaded on the upper end of the sleeve 113 so as to compress said packing material 128 and seal the shaft 118 against water passage. The extreme upper end of the rotary operating shaft 118 is provided with an enlarged flange 131 and threaded for receiving a nut 132. An operating wheel 133 is held in place by the nut 132 and clamped against the flange 131 so that rotation of the handle 133 will seat and unseat the valve member 120. Diametrically opposed projections 134 are formed on the handle 133 to be engaged by a wrench or the like to facilitate operation of the valve if the same should become stuck. It is noted that the pipe sections of the valve casing 80 may be held together in a jig or fixture while being welded at the points 85, 87 and 98, or, if desired, the parts may be held together by tack welding applied to their union by the various welds 85, 87 and 98.

It will thus be seen that a great number of valves may be formed of the heavy duty pipe in an economical and cheap manner without sacrificing the strength of the valve, and actually, the formation of the valve from all steel parts rather than by casting as usual to form the valve casing, provides a valve which is considerably stronger by reason of the difference in tensile strength of steel tubing over cast iron castings.

It is to be understood that the forms of the invention herewith shown and described are to be taken as preferred embodiments of the same and that various changes may be made in the shape, size and arrangement of parts without departing from the spirit of the invention or the scope of the subjoined claims.

What I claim is:

1. A fabricated valve body comprising a valve chamber structure formed of a tubing section having a sidewall opening thereon and having an annular flange welded to each end thereof, one of said flanges on its inner side having a valve seat receiving portion and on its outer side having an annular flat surface, and the other flange having a valve bonnet receiving portion; and inlet and outlet pipe sections of substantially uniform diameter but of smaller diameter than said tubing section arranged substantially end to end, said pipe sections having their inner ends cut diagonally to provide elliptically-shaped edge portions, the elliptically-shaped edge portion of one pipe section being welded to said tubing section in communication with the sidewall opening thereof and the elliptically-shaped edge portion of the other pipe section in the areas near the extremities of the major and minor axes being welded to the valve chamber structure adjacent the outer and inner peripheral edges respectively of said valve seat receiving flange, the diameter of said other pipe section along the major axis of the ellipse formed by the diagonally cut end thereof being substantially equal to or less than the diameter of said tubing section.

2. A fabricated valve body comprising a valve chamber structure formed of a tubing section having a sidewall opening therein and having an annular flange welded to each end thereof, one of said flanges having a valve seat receiving portion and the other flange having a valve bonnet receiving portion; and inlet and outlet pipe sections of substantially uniform diameter but of smaller diameter than said tubing section arranged substantially end to end, said pipe sections having their inner ends cut diagonally to provide elliptically-shaped edge portions, the elliptically-shaped edge portion of one pipe section being welded to said tubing section in communication with the sidewall opening thereof and the elliptically-shaped edge portion of the other pipe section being welded partly to said tubing section and partly to said valve seat receiving flange, the diameter of said other pipe section along the major axis of the ellipse formed by the diagonally cut end thereof being substantially equal to or less than the diameter of said tubing section.

3. A fabricated valve body comprising a valve chamber structure formed of a tubing section having a sidewall opening therein and having an annular flange welded to each end thereof, one of said flanges having a valve seat receiving portion and the other flange having a valve bonnet receiving portion; and inlet and outlet pipe sections of substantially uniform diameter but of smaller diameter than said tubing section arranged substantially end to end, said pipe sections having their inner ends cut diagonally to provide elliptically-shaped edge portions, the elliptically-shaped edge portion of one pipe section being welded to said tubing section in communication with the sidewall opening thereof and the elliptically-shaped edge portion of the other pipe section being welded substantially in its entirety to said valve seat receiving flange, the diameter of said other pipe section along the major axis of the ellipse formed by the diagonally cut end thereof being substantially equal to or less than the diameter of said tubing section.

DONALD R. McMULLEN.

REFERENCES CITED

The following references are of record in the file of this patent:

UNITED STATES PATENTS

| Number | Name | Date |
|---|---|---|
| 503,478 | Frisbie | Dec. 4, 1894 |
| 1,529,583 | Ehrmann | Mar. 10, 1925 |
| 1,659,743 | Parrigan | Feb. 21, 1928 |
| 1,771,187 | Murray | July 22, 1930 |
| 1,779,503 | Swindin | Oct. 28, 1930 |
| 1,935,329 | Needham | Nov. 14, 1933 |
| 2,117,044 | Spence | May 10, 1938 |
| 2,122,957 | Santamaria | July 5, 1938 |
| 2,347,676 | Eplett | May 2, 1944 |

FOREIGN PATENTS

| Number | Country | Date |
|---|---|---|
| 6,008 | Great Britain | 1905 |
| 14,098 | Great Britain | 1891 |